(12) United States Patent
Probst et al.

(10) Patent No.: US 6,224,999 B1
(45) Date of Patent: May 1, 2001

(54) HEADER INSULATOR WITH BOSSES

(75) Inventors: Joseph M. Probst, Williamsville; William M. Paulot, Lancaster, both of NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/359,507

(22) Filed: Jul. 23, 1999

(51) Int. Cl.⁷ ..................................................... H01M 2/04

(52) U.S. Cl. .......................... 429/175; 429/101; 429/199; 429/177

(58) Field of Search ................................. 429/199, 101, 429/175, 186, 177

(56) References Cited

U.S. PATENT DOCUMENTS

| | | | |
|---|---|---|---|
| 2,527,576 | 10/1950 | Ruben | 136/111 |
| 4,191,806 | 3/1980 | Levy | 429/56 |
| 4,320,182 | 3/1982 | Sugalski | 429/94 |
| 5,434,017 | 7/1995 | Berkowitz et al. | 429/94 |
| 5,626,988 | 5/1997 | Daniel-Ivad et al. | 429/229 |
| 5,674,639 | 10/1997 | Urry | 429/122 |
| 5,750,286 | * 5/1998 | Paulot et al. . | |

* cited by examiner

*Primary Examiner*—John S. Maples
(74) *Attorney, Agent, or Firm*—Hodgson Russ LLP

(57) ABSTRACT

A header insulator for an electrochemical cell is described. The header insulator provides a boss for the terminal ferrule, a boss for the fill ferrule, and at least one boss disposed along the length of the insulator to provide for alignment of the electrode assembly inside the case.

18 Claims, 2 Drawing Sheets

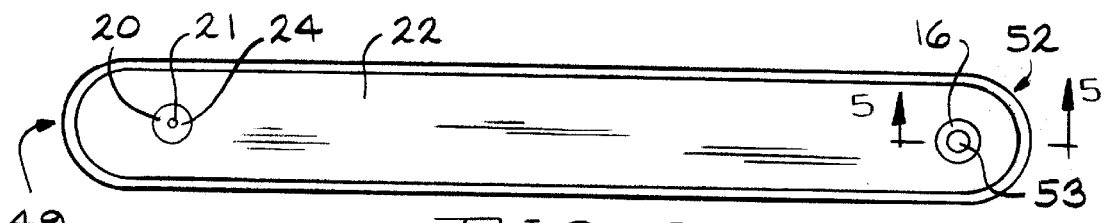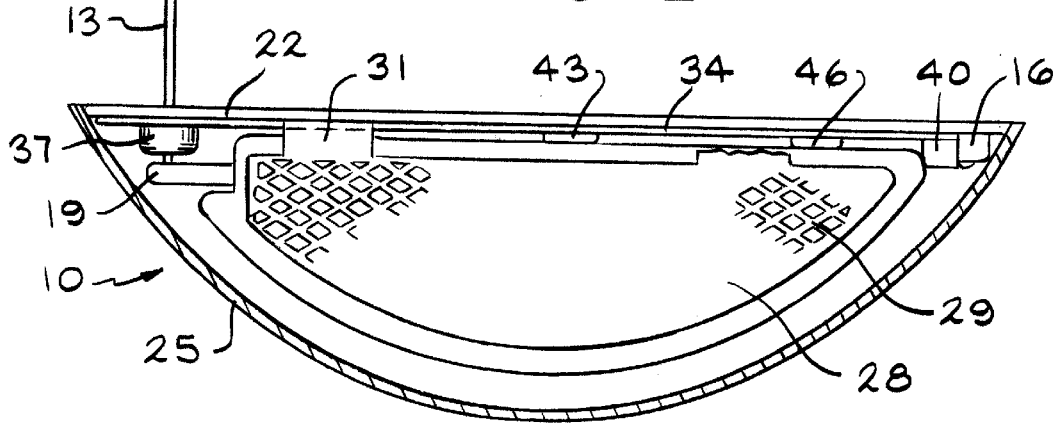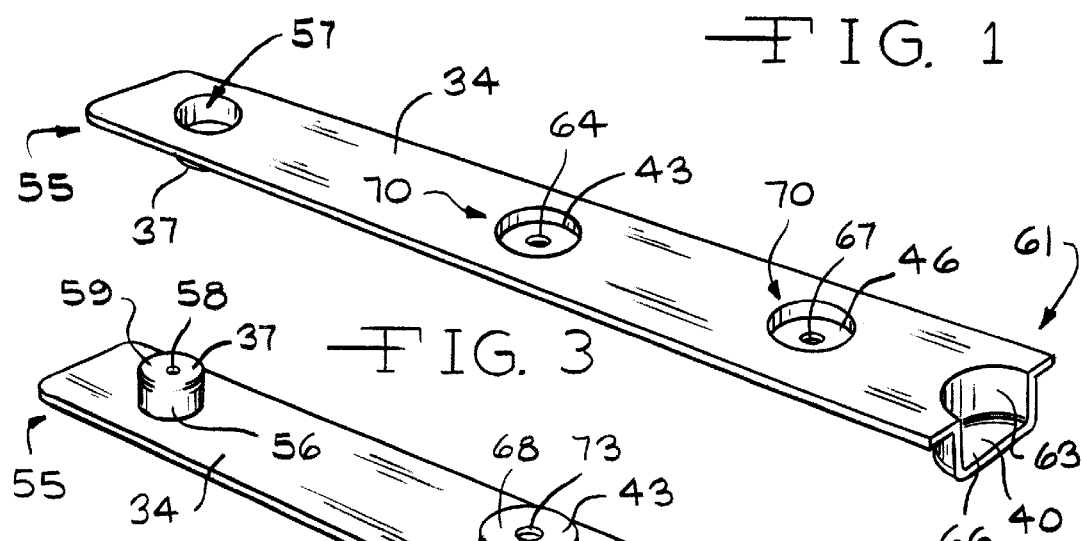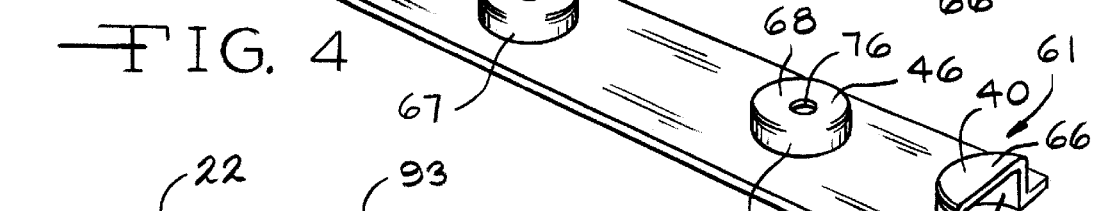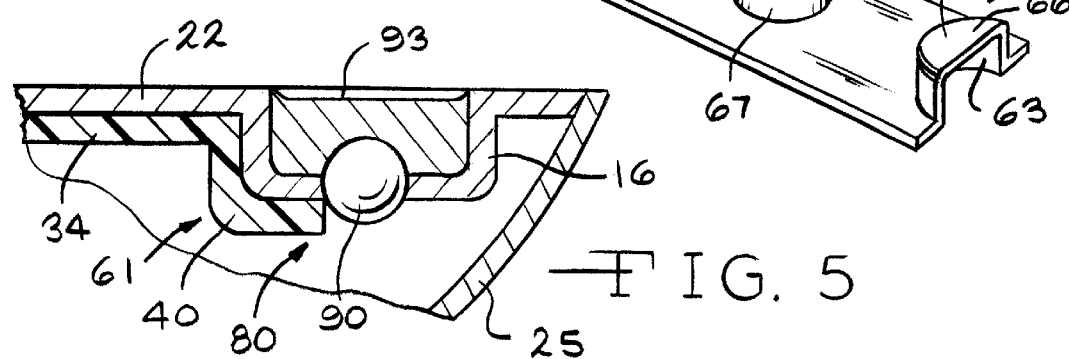

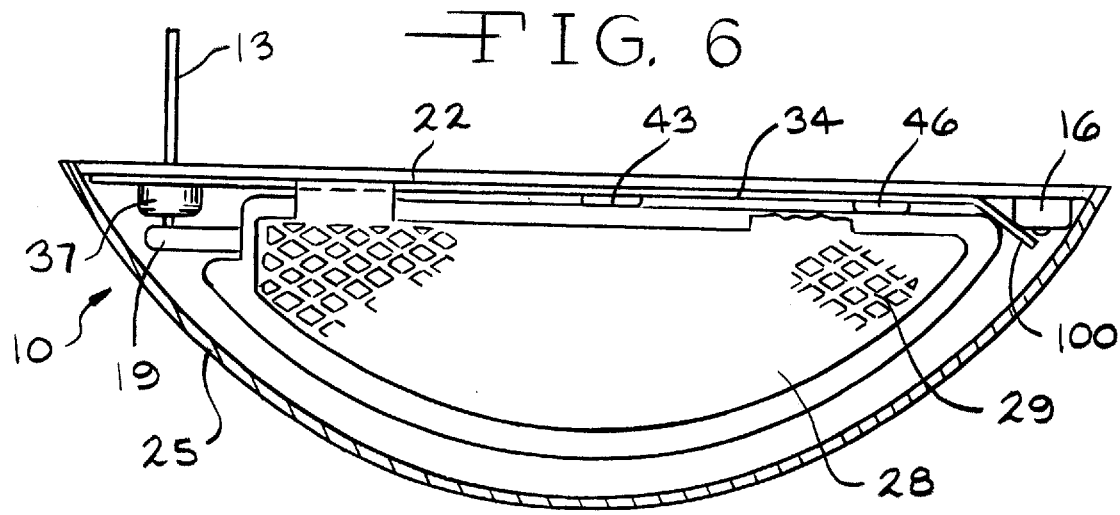
FIG. 6
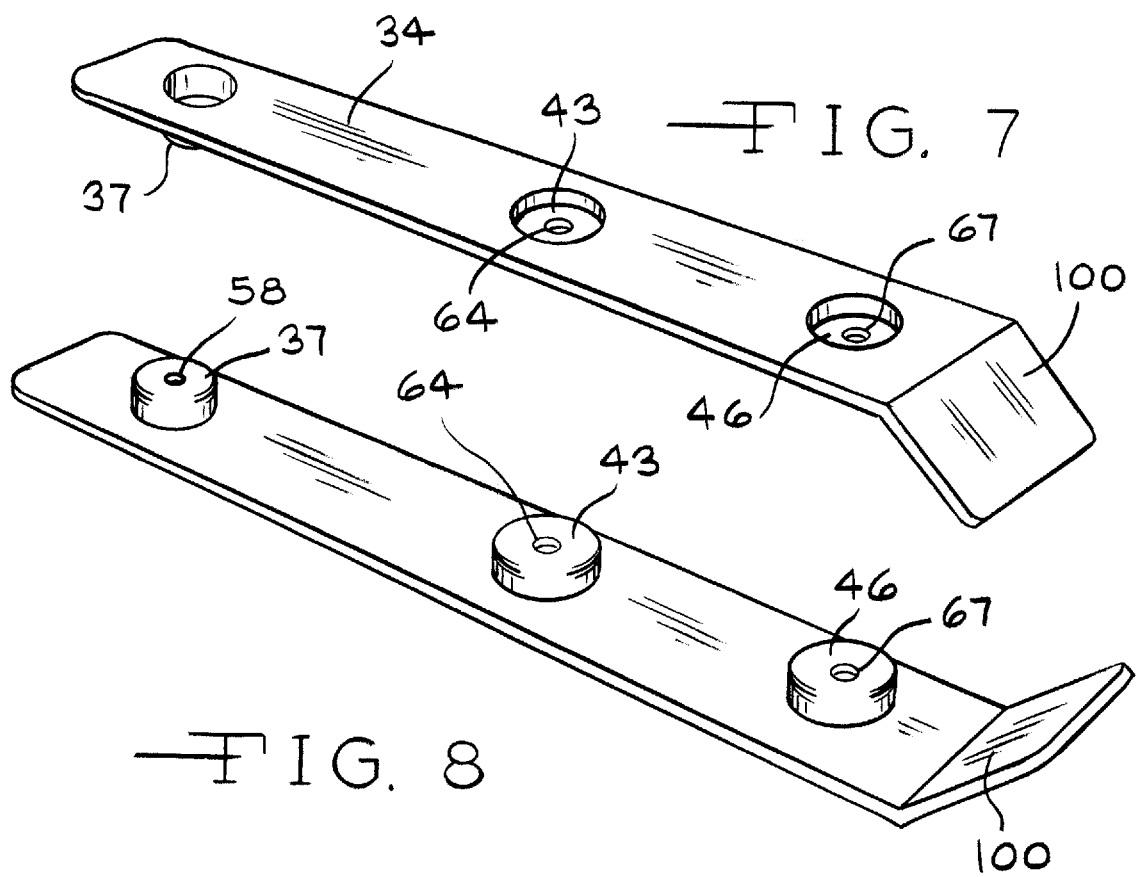
FIG. 7
FIG. 8

HEADER INSULATOR WITH BOSSES

FIELD OF INVENTION

The present invention relates to the art of electrochemical cells, and more particularly, to a new and improved header insulator for an electrochemical cell used in implantable medical devices. Further, the present invention relates to an electrochemical cell comprising the novel header insulator and a method of providing an electrochemical cell incorporating the same.

BACKGROUND OF THE INVENTION

Present battery designs typically include several insulators assembled to the inside of a battery header. First, the terminal ferrule for case conductive designs is usually provided with an insulator that serves two primary functions. The insulator electrically insulates the terminal ferrule and the feed-through pin from the internal electrodes of the battery. Also, it isolates the glass to metal seal and prevents leakage of electrolyte.

Second, an insulating strap type insulator is typically disposed adjacent to the interior surface of the header in order to electrically insulate the internal surface of the header from the internal electrodes of the battery to prevent short circuits. Third, a welding shield provides thermal insulation between the header and the internal battery components (in particular the separator) when the header is welded to the top of the battery case.

Finally, the fill ferrule is also usually provided with an insulator that serves a couple of functions. It electrically insulates the fill ferrule from the internal electrodes of the battery, and it thermally insulates the fill ferrule from other internal battery components, particularly the separator, when the final close weld is conducted.

Each of the individual insulators adds to the manufacturing costs and adds to the steps required for assembly. Accordingly, what is needed is a unitary header insulator that meets all of the electric and thermal insulation requirements of the above-described insulators and that facilitates alignment of the battery electrodes within the case.

SUMMARY OF THE INVENTION

The present invention meets the above-described needs by providing a header insulator that is preferably manufactured from a material with properties for electrical and thermal insulation and that is formed out of a unitary member having a plurality of integrally formed bosses. The header insulator provides a terminal ferrule boss, a fill ferrule boss, and at least one additional boss for maintaining the alignment of the battery electrodes.

The present invention is disposed between the lid of an electrochemical cell and the electrode assembly. In a typical electrochemical cell, the electrode assembly has terminal leads extending from the anode electrode and the cathode electrode such that positive and negative terminals are created for attachment to an external circuit. In a "case negative" configuration, the anode electrode is connected to the case such that the exterior surface of the case serves as the negative terminal. A feed-through pin establishes the positive terminal and is connected to the cathode electrode through an opening in the lid. The inside of the opening is a glass insulator that keeps the cathode electrically isolated from the case.

The present invention provides a header insulator with a first boss capable of registering with the terminal ferrule such that it is electrically and thermally insulated from the electrode assembly. A second boss on the opposite side of the insulator provides for thermal and electrical insulation of the fill ferrule from the remainder of the electrode assembly. Additional bosses are disposed along the length of the insulator and extend downward into the case such that the electrode assembly is prevented from becoming misaligned. If the electrodes become misaligned, the performance of the battery is degraded.

The design of the present invention is advantageous for several reasons. First, substitution of a single insulating member for several insulating members reduces the costs associated with manufacturing due to fewer parts and easier assembly. Second, the additional bosses on the header insulator maintain the alignment of the electrode assembly such that the performance of the battery is not degraded by misalignment of the anode and cathode electrodes. The additional bosses are advantageously equipped with openings to prevent isolated build-up of electrolyte that could lead to decreased battery performance.

It is an object of the present invention to reduce the number of separate insulators in an electrochemical cell and to align the battery electrodes to insure optimal battery performance.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which:

FIG. 1 is a cut-away side elevational view of an electrochemical cell provided with the header insulator of the present invention;

FIG. 2 is a top plan view of the lid of the electrochemical cell;

FIG. 3 is a perspective view of the top of the header insulator of the present invention;

FIG. 4 is a perspective view of the bottom of the header insulator;

FIG. 5 is a sectional view taken along lines 5—5 of FIG. 2;

FIG. 6 is a cut-away side view of an electrochemical cell having an alternate embodiment of the header insulator of the present invention;

FIG. 7 is a top perspective view of the alternate embodiment of the header insulator; and, FIG. 8 is a bottom perspective view of the alternate embodiment of the header insulator.

DESCRIPTION OF THE PREFERRED EMBODIMENTS

In FIG. 1, a prismatic electrochemical cell 10 has a feed-through pin 13 and a fill ferrule 16. Although the present invention is described in connection with a prismatic cell, it is not intended to be limited to that configuration. Accordingly, the present invention is suitable for use with other shapes of battery cases and other electrode assemblies. The general design of the prismatic electrochemical cell 10 is well known in the art, and an example is provided in U.S. Pat. No. 5,750,286 to Paulot et al., which is assigned to the assignee of the present invention and is incorporated herein by reference. The feed-through pin 13 is connected by a connection tab 19 to a cathode electrode (hidden underneath the anode). The pin 13 passes through an opening 21 (shown in FIG. 2) in the lid 22 and is electrically insulated from the anode electrode and the case 25 including the lid 22 by a glass insulator 24 sealing between the pin 13 and the terminal ferrule 20. The anode electrode 28 is shown with a current collector screen 29 attached thereto by methods known to those of ordinary skill in the art. The anode electrode 28 has a tab connector 31 that preferably connects to the underside of the lid 22 as disclosed in U.S. Pat. No. 5,250,373 to Muffoletto, which is assigned to the assignee of the present invention and which is incorporated herein by reference. By connecting the anode electrode to the lid 22, the electrochemical cell 10 is thereby disposed in the "case negative" configuration.

A header insulator 34 according to the present invention has a first boss 37 in registry with the terminal ferrule 20 and a second boss 40 that partially encapsulates fill ferrule 16. A third boss 43 and a fourth boss 46 also extend from the underside of the header insulator 34 as described herein below.

In FIG. 2, the lid 22 is preferably planar, elongate and curved at opposite ends 49, 52. The lid 22 has an opening 21 for the ferrule 20 sealed about the feed-through pin 13 at the first end 49 and an opening 53 for the fill ferrule 16 at the opposite end 52. After the fill ferrule 16 is used to fill the cell 10 with electrolyte, the fill ferrule 16 is sealed as known to those of ordinary skill in the art. An example of a hermetic seal for sealing the electrolyte fill opening is disclosed in U.S. Pat. No. 5,776,632 to Honegger, which is assigned to the assignee of the present invention and which is incorporated herein by reference.

Referring to FIGS. 3–4, the header insulator 34 of the present invention for use with prismatic cell 10 is elongate, rectangular, and planar. The choice of materials for the insulator depends on three principal factors: electrical insulation, thermal insulation, and volume. The electrical and thermal insulation properties are necessary to prevent short circuits and to protect the electrode assembly during the welding of the lid 22 to the battery case 25 and the welding of the seal for the fill ferrule 16. The volume of space required for the header insulator 34 is to be minimized in order to maximize the available space for electrochemically active materials.

At a first end 55 of the header insulator 34, the first boss 37 preferably comprises a cylindrically-shaped side wall 56 having an open end 57 connected to the body of the header insulator 34. The cylindrical side wall 56 extends to a bottom wall 59 that is parallel to the surface of header insulator 34 and includes an opening 58 that receives the feed-through pin 13. The opening 58 is aligned along the longitudinal axis of the boss 37. The cylindrical side wall 56 and bottom wall 59 of the first boss 37 form a recess that snugly receives the terminal ferrule 20. The first boss 37 preferably provides an interference fit with the terminal ferrule 20. Other shapes and sizes for the first boss 37 beside cylindrical are also suitable depending on the geometry of the terminal ferrule 20.

At the opposite end 61 of the insulator 34, the second boss 40 partially encloses and registers with the fill ferrule 16. The second boss 40 is shaped substantially in the form of a bisected cylinder having a side wall 63 and a bottom wall 66. As such, the second boss 40 partially encloses the fill ferrule 16 and also prevents rotation of the insulator 34 about the terminal ferrule 20 at the first boss 37.

The third and fourth bosses 43, 46 are disposed intermediate the first boss 37 and the second boss 40 along the length of the header insulator 34. The bosses 43 and 46 are shown in the form of cylinders having side walls 67 and bottom walls 68. The bottom walls 68 on each boss 43, 36 are preferably coplanar for maintaining alignment of the electrode assembly inside the case 25. The side walls 67 terminate at one end in an opening 70 connected to the main body of the header insulator 34. At the opposite end, the bottom wall 68 attaches to the end of the cylindrical side walls 67 and is disposed substantially parallel to the header insulator 34. However, the specific geometry of the bosses is not critical. Other shapes and sizes are also suitable depending on the application. For example, it is contemplated by the scope of the present invention that the boss is a solid member depending downwardly from the plane of the main body of the header insulator 34. Also, the number of bosses 43, 46 is not critical as the width of the bosses can be varied. In fact a single, wider boss may be suitable in some applications.

The third and fourth or intermediate bosses 43 and 46 provide for proper alignment of the anode and cathode portions of the electrode assembly with respect to the case 25 and lid 22.

The bottom wall 68 preferably has openings 73, 76 that are disposed along the longitudinal axis of the bosses 43, 46 and allow for the escape of electrolyte. However, the openings 73, 76 may not be required in applications where the electrolyte does not accumulate between the lid 22 and the header insulator 34. The bosses 43, 46 are preferably spaced along the length of the header insulator 34 and extend down into the inside of the case 25 such that the electrode assembly is prevented from moving inside the case 25. For example, the bosses 43, 46 will abut with the separator on the center portion of the anode in the electrode assembly design disclosed in U.S. Pat. No. 5,250,373 to Muffoletto. In this design, a central portion of the anode electrode is substantially flat and extends parallel to the lid 22 of the case 25, and a pair of wing portions of the anode extend on each side of the cathode electrode.

Without the bosses 43, 46, the electrode assembly could become misaligned. When the electrodes are misaligned due to shifting inside the case 25, the battery performance suffers. Accordingly, the bosses 43 and 46 provide a mechanical barrier to prevent the electrode assembly from moving inside the case and to prevent the anode and cathode electrodes from moving relative to one another to become misaligned.

Turning to FIG. 5, the end 80 of the header insulator 34 partially surrounds the fill ferrule 16. An example of the seals 90, 93 for the fill ferrule 16 is disclosed in U.S. Pat. No. 5,776,632 to Honegger, as described above.

In FIG. 6, an alternate embodiment of the header insulator 34 of the electrochemical cell 10 is shown. In the alternate embodiment, the boss 40 (FIGS. 1, 3–5) that partially enclosed the fill ferrule 16 has been removed and replaced by an angled planar member 100. As shown in FIGS. 7 and 8, the angled planar member 100 provides a shield for the fill ferrule 16. The member 100 substantially shields the fill ferrule 16 from the electrodes such that the fill ferrule does not cause a short circuit and such that the final closing weld does not damage the electrodes.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A header insulator for use with an electrochemical cell having an electrode assembly with an anode electrode and cathode electrode housed in a case open at one end, a lid capable of being sealed to the open end of the case, a terminal ferrule, and a fill ferrule, the header insulator, comprising:
   a) a body of electrically and thermally insulating material disposed between the electrode assembly and the lid;
   b) a first boss disposed on the body and sized to register with the terminal ferrule;
   c) a second boss disposed on the body and sized to register with the fill ferrule; and,
   d) a third boss disposed on the body and sized to prevent movement of the electrode assembly inside the case.

2. The header insulator of claim 1, wherein the first boss frictionally fits around the terminal ferrule.

3. The header insulator of claim 1, wherein the third boss prevents rotation of the header insulator about the terminal ferrule.

4. The header insulator of claim 1, wherein the third boss has an opening disposed therein.

5. The header insulator of claim 1, wherein the first boss is substantially cylindrical.

6. The header insulator of claim 1, wherein the second boss is in the shape of a bisected cylinder.

7. The header insulator of claim 1, wherein the third boss is cylindrical.

8. The header insulator of claim 1, where the third boss is solid.

9. The header insulator of claim 1, wherein the second boss at least partially encloses the fill ferrule.

10. An electrochemical cell, comprising;
    a) a case having a surrounding side wall extending to an open end of the case;
    b) a lid sealed to the open end of the case;
    c) an electrode assembly having a first electrode and a second electrode, the first electrode and second electrode having a separator disposed therebetween inside the case and being in electrical association with each other;
    d) a terminal ferrule having a terminal lead with a first end disposed inside the case and connected to the first electrode and a second end adapted to be connected to a load;
    e) an electrolyte solution activating the first and second electrodes;
    f) a fill ferrule disposed inside an opening in the lid and capable of receiving the electrolyte solution;
    g) a header insulator having a body of electrically and thermally insulating material disposed between the electrode assembly and an interior surface of the lid;
    h) a first boss disposed on the body and sized to register with the terminal ferrule;
    i) a second boss disposed on the body and sized to register with the fill ferrule; and,
    j) a third boss disposed on the body and sized to prevent movement of the electrode assembly inside the case.

11. The header insulator of claim 10, wherein the first boss frictionally fits around the terminal ferrule.

12. The header insulator of claim 10, wherein the third boss prevents rotation of the header insulator about the terminal ferrule.

13. The header insulator of claim 10, wherein the third boss has an opening disposed therein.

14. The header insulator of claim 10, wherein the first boss is substantially cylindrical.

15. The header insulator of claim 10, wherein the second boss is in the shape of a bisected cylinder.

16. The header insulator of claim 10, wherein the third boss is cylindrical.

17. The header insulator of claim 10, wherein the second boss at least partially encloses the fill ferrule.

18. The header insulator of claim 1, wherein the third boss is solid.

* * * * *